US011529779B2

United States Patent
Piotrowski et al.

(10) Patent No.: US 11,529,779 B2
(45) Date of Patent: Dec. 20, 2022

(54) METHOD OF PRODUCING A LENS WITH AN EMBEDDED FOIL

(71) Applicant: Interglass Technology AG, Steinhausen (CH)

(72) Inventors: Daniel Piotrowski, Steinhausen (CH); René Josef Ulrich, Weggis (CH); Lutz Körner, Urdorf (CH)

(73) Assignee: INTERGLASS TECHNOLOGY AG, Steinhausen (CH)

( * ) Notice: Subject to any disclaimer, the term of this patent is extended or adjusted under 35 U.S.C. 154(b) by 288 days.

(21) Appl. No.: 16/346,649

(22) PCT Filed: Nov. 3, 2017

(86) PCT No.: PCT/EP2017/078230
§ 371 (c)(1),
(2) Date: May 1, 2019

(87) PCT Pub. No.: WO2018/087011
PCT Pub. Date: May 17, 2018

(65) Prior Publication Data
US 2020/0070453 A1    Mar. 5, 2020

(30) Foreign Application Priority Data
Nov. 3, 2016  (EP) ..................... 16196974

(51) Int. Cl.
*B29D 11/00*   (2006.01)
*B29C 39/10*   (2006.01)

(52) U.S. Cl.
CPC ........ *B29D 11/00413* (2013.01); *B29C 39/10* (2013.01); *B29D 11/00442* (2013.01);
(Continued)

(58) Field of Classification Search
CPC ........ B29D 11/00413; B29D 11/00442; B29D 11/00528; B29D 11/00644; B29C 39/10
See application file for complete search history.

(56) References Cited

U.S. PATENT DOCUMENTS

| 6,353,503 B1 | 3/2002 | Spitzer et al. |
| 2012/0229759 A1 | 9/2012 | Tamura et al. |

(Continued)

FOREIGN PATENT DOCUMENTS

| CN | 103930808 | 7/2014 |
| EP | 2930013 A1 | 10/2015 |

(Continued)

OTHER PUBLICATIONS

Smith, Warren J., Modern Optical Engineering: The Design of Optical Systems. New York: McGraw-Hill, 2000, pp. 192-195. Print.

(Continued)

*Primary Examiner* — Mathieu D Vargot
(74) *Attorney, Agent, or Firm* — Fish & Richardson P.C.

(57) ABSTRACT

A lens with an embedded foil is produced by positioning a foil on a holder, providing adhesive attachment dots on the foil on surface portions opposite to the holder, positioning a front mould ensuring the contact of the dots with a front mould surface, retracting the holder and positioning a back mould opposite to the front mould. The mould is then connected with a sealing bridge to build an assembly forming a mould cavity with a pouring opening. The edge of the foil is spaced apart from the bridge and the assembly has passages between the dots, the foil, and the front mould surface allowing pouring a monomer into the cavity before curing the monomer, decomposing the assembly and cutting the lens from the polymer block.

22 Claims, 10 Drawing Sheets

(52) U.S. Cl.
CPC .. *B29D 11/00528* (2013.01); *B29D 11/00644* (2013.01); *B29K 2715/006* (2013.01)

(56) References Cited

U.S. PATENT DOCUMENTS

| | | |
|---|---|---|
| 2014/0293217 A1 | 10/2014 | Ogaya et al. |
| 2015/0293375 A1 | 10/2015 | Pfeffer et al. |
| 2016/0144582 A1 | 5/2016 | Ihara et al. |
| 2016/0176131 A1 | 6/2016 | Ihara et al. |

FOREIGN PATENT DOCUMENTS

| | | |
|---|---|---|
| JP | S63292476 A | 11/1988 |
| JP | H04298583 A | 10/1992 |
| JP | 20093303 A | 1/2009 |
| JP | WO2010073625 A1 | 7/2010 |
| JP | 2012120985 | 6/2012 |
| JP | 2012198389 A | 10/2012 |
| JP | 2012198390 A | 10/2012 |
| JP | 2013218179 A | 10/2013 |
| KR | 1020110092535 | 8/2011 |
| WO | 2006003099 A1 | 1/2006 |
| WO | WO 2014021466 | 2/2014 |
| WO | WO 2014077338 | 5/2014 |
| WO | WO 2014077339 | 5/2014 |

OTHER PUBLICATIONS

International Search Report in International Appln. No. PCT/EP2017/078230, dated May 17, 2018, 10 pages.
International Preliminary Report on Patentability in International Appln. No. PCT/EP2017/078230, dated May 7, 2019, 7 pages.

METHOD OF PRODUCING A LENS WITH AN EMBEDDED FOIL

CROSS-REFERENCE TO RELATED APPLICATIONS

This application is the United States national phase of International Application No. PCT/EP2017/078230 filed Nov. 3, 2017, and claims priority to European Patent Application No. 16 196 974.6 filed Nov. 3, 2016, the disclosures of which are hereby incorporated by reference in their entirety.

BACKGROUND OF THE INVENTION

Field of the Invention

The present invention relates to a method of producing a lens with an embedded foil.

Description of Related Art

Optical head-mounted displays relate to wearable devices that have the capability of reflecting projected images as well as allowing the user to see through it at the same time, creating augmented reality.

U.S. Pat. No. 6,353,503 A relates to the reduction of head-mounted display optics to a scale commensurate with incorporation within eyeglasses wherein optical elements are provided inside the eyeglass lens and coupled to exterior optics by a significant degree of refraction at the surface of the eyeglass lens. This leads to a substantial reduction in the degree of deviation from axial optics, and a commensurate reduction in aberrations. According to FIG. 6 the lens may be assembled using two sections that are formed by any number of techniques known in the art, including injection moulding, casting, or grinding and polishing. The surface of one of the sections is then coated with multi-layer thin films designed to reflect the desired polarization or wavelength. For example, if the image source is illuminated by narrow bands of red, green, and blue light, then the films are designed to reflect these particular wavelength bands and pass others. Alternatively, if the image source emits linearly polarized light, as is the case for many active matrix liquid crystal displays, then the multi-layers are selected to reflect one linear polarization and to pass the orthogonal linear polarization. Both polarization-selecting and wavelength-selecting coatings are well known in the optics art. (See, for example, W. J. Smith, "Modern Optical Engineering," McGraw-Hill, p. 192.) A third alternative is to use a thin metal coating that passes approximately one-half the light and reflects approximately one-half the light, as may be formed, for example, by a layer of aluminum, chromium, or silver with thickness on the order of several hundred angstroms, the exact thickness being specific to the material used. A diffractive or holographic layer can also be used instead of or in addition to multi-layer coatings. In such a case, the holographic or diffractive layer is first formed separately and is then placed between two curved, tilted, or flat sections, the curvature or tilt depending on the desired optical design.

EP 2 930 013 is related to a method of producing a spectacle lens having a decorative element comprising the steps of applying one or more decorative elements to a planar piece of foil at one or more predetermined positions, thereafter permanently deforming the piece of foil in such a way that at least one region of the piece of foil is a curved surface whereas a flat boundary strip remains, thereafter positioning the deformed piece of foil between a front mould and a rear mould and connecting the flat boundary strip of the piece of foil with glue to one of the two moulds to build a composite in order to form a mould cavity with a pouring opening, wherein the deformed piece of the foil is spaced from the front mould and the rear mould, thereafter pouring a monomer into the mould cavity, thereafter curing the monomer into a monomer block, thereafter decomposing the composite and thereby detaching the two moulds from the monomer block, and thereafter cutting the spectacle lens from the monomer block.

US 2016/0176 131 A discloses a method of producing a lens with an embedded foil.

SUMMARY OF THE INVENTION

It is an object of the invention to overcome the limitations inherent to the prior art using two sections with an intercalated optical film, while on the other side, if a cured monomer is used to create the lens, it is an object of the invention to improve the positioning of the foil inside the mould cavity.

A method of producing a lens with an embedded foil comprises the steps of providing a front mould, providing a foil fixation holder, providing a back mould, providing a foil having at least one region being a curved surface, positioning the foil on the foil fixation holder, providing attachment dots on the foil on surface portions opposite to the foil fixation holder through application of an adhesive forming said attachment dots, positioning the front mould opposite to the foil fixation holder, displacing the front mould towards the foil fixation holder to ensure the contact of the attachment dots with a surface of the front mould, retracting the foil fixation holder, positioning the back mould opposite to the front mould, wherein the foil is spaced from the back mould, connecting the front mould and the back mould at their circumferences with a sealing bridging element to build an assembly in order to form a mould cavity with a pouring opening, wherein the edge of the foil is spaced apart from the bridging element and the assembly comprises passages between the attachment dots and the foil and the backside of the front mould, pouring a monomer into the mould cavity, curing the monomer into a polymer block, decomposing the assembly and thereby detaching the front mould and the back mould from the polymer block, and cutting the lens with the embedded foil from the monomer block, wherein the method comprises a further step after the displacing step of the first mould to ensure the contact of the attachment dots: displacing the first mould to adjust the desired distance between the first mould and the foil.

It is an advantage of providing initially a rear or lower fixation mould to allow a secure positioning of the foil on well-defined regions of the backside of the front mould through a number of attachment dots with a mould and holder displacement step adjusting the distance of the foil from the front mould to stretch or compress the attachment dots being in contact with mould and foil to define the final distance of the foil from the first mould. It is an advantage of the additional adjustment step for providing the distance of the foil from the front surface of the lens, optionally with an adjustment of the inclination angle, that the method allows to directly cast the lens according to prescription by choosing the right two moulds for the final lens prescription with the possibility of the invention to align the foil directly relative to both final optical lens surfaces. This procedure according to the invention has certain advantages for augmented reality applications, where the exact distance to both lens surfaces is more critical than for polarized foils.

It is clear that the wording front and back for the two moulds can be exchanged and that the fixation of the foil can be provided on the back mould by either dispensing the adhesive dots on the back mould or on the formed foil. In this case the convex side (compared to FIG. 7) would be facing down. The front mould is referenced as the first mould and the back mould is referenced as the second mould.

The attachment dots can be adhesive dots or curable, especially UV curable, adhesive dots which are cured before the monomer of the lens is filling the cavity. The dots are preferably distributed in regular angular distances one from another. There can be between four and twenty fixation dots. They can also be ring sections near the circumference of the foil. It is an advantage if the curved foil comprises a flat outer ring section. However, it is also possible that the entire foil is curved. Then the corresponding attachment surfaces of the rear mould as well as the backside of the front mould are preferably curved in the same complementary manner.

The step of providing a foil having at least one region being a curved surface can comprise applying a planar foil at one or more predetermined positions and deforming the foil in such a way that at least one region of the foil is a curved surface.

The step of positioning the foil on the foil fixation holder can comprise positioning flat surface portions of the foil on a flat surface of the foil fixation holder comprising one or more recesses connected to a vacuum pump to ensure the suctioning of the flat surface portions of the foil against said flat surface.

The step of positioning the foil on the foil fixation holder can comprise positioning flat surface portions of the foil on a flat surface of the foil fixation holder, wherein the edge of the foil abuts against a shoulder of the foil fixation holder.

After the step of positioning of the first mould, a further step can be included to align the first mould relative to the foil on the foil fixation holder in angular and lateral direction.

After displacing the first mould to ensure the contact of the attachment dots, the first mould could be displaced further to adjust the desired distance between the first mould and the foil. Therefore a distance adjusting spreader can be provided to engage the ring shaped underside of the first mould and the outer top surface of the foil fixation holder. Since the contact of the attachment dots between mould and foil is made, the distance adjusting spreader can e.g. either increase or decrease the distance between mould and holder whereby the attachment dots are stretched or compressed, wherein said distance between mould and foil on the holder (and angular relationship) is then finally fixable, when the adhesive is hardening or, preferably cured.

If the product of the method is a polymer block then furthers steps can be added after the disassembly step, relating to grinding and polishing the back and/or front surface according to the desired prescription, and cutting the lens with the embedded foil from the polymer block to fit in a frame.

It is possible to provide a dispenser head of the adhesive with a number of outlets and spouts allowing within the step of providing attachment dots to apply the adhesive forming said attachment dots all at the same time.

The method is even more versatile when the step of providing attachment dots comprises two or more sub-steps of providing multiple attachment dots on top of each other in order to be able to realize larger distances of foil to first mould. Each attachment dot of any of these sub-steps is intermittently cured and hardened in a intermittent curing step in between each layer of dots.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF THE INVENTION

Figure 1:
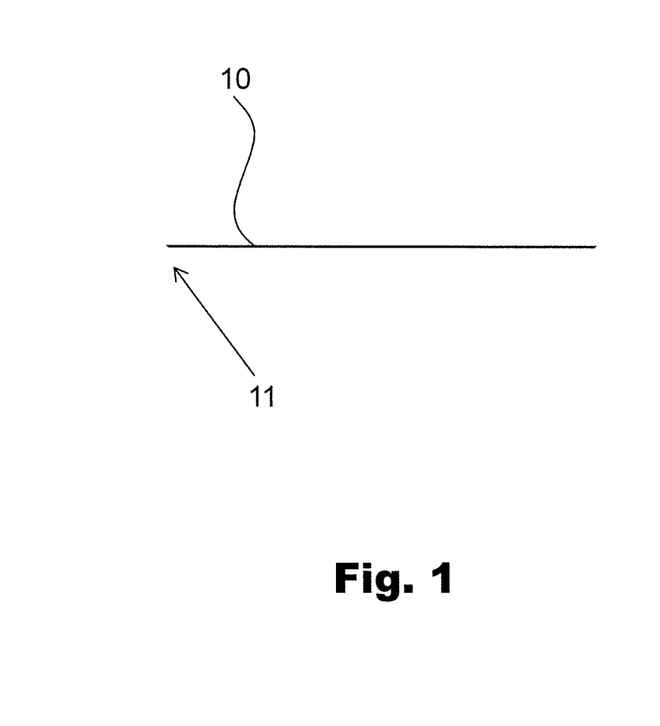
FIG. 1 shows a side view of a foil at the beginning of a method according to an embodiment of the invention.
Figure 2:
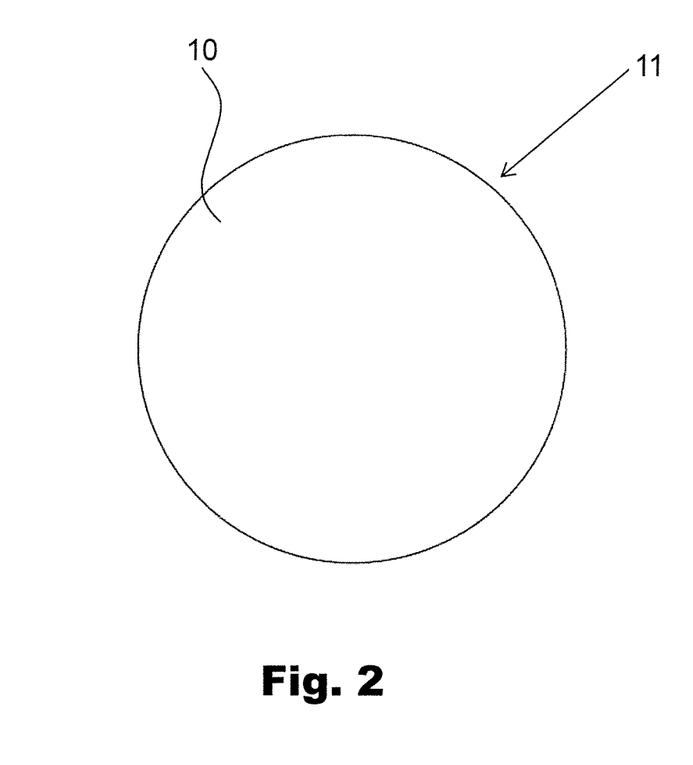
FIG. 2 shows a view from above on the foil of FIG. 1.
Figure 3:
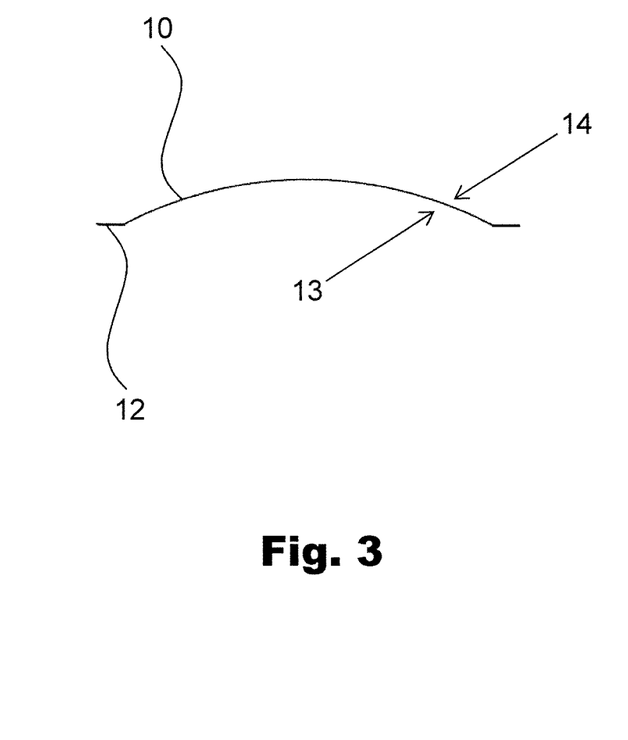
FIG. 3 shows a side view of the foil of FIG. 1 after undergoing a shape forming step.
Figure 4:
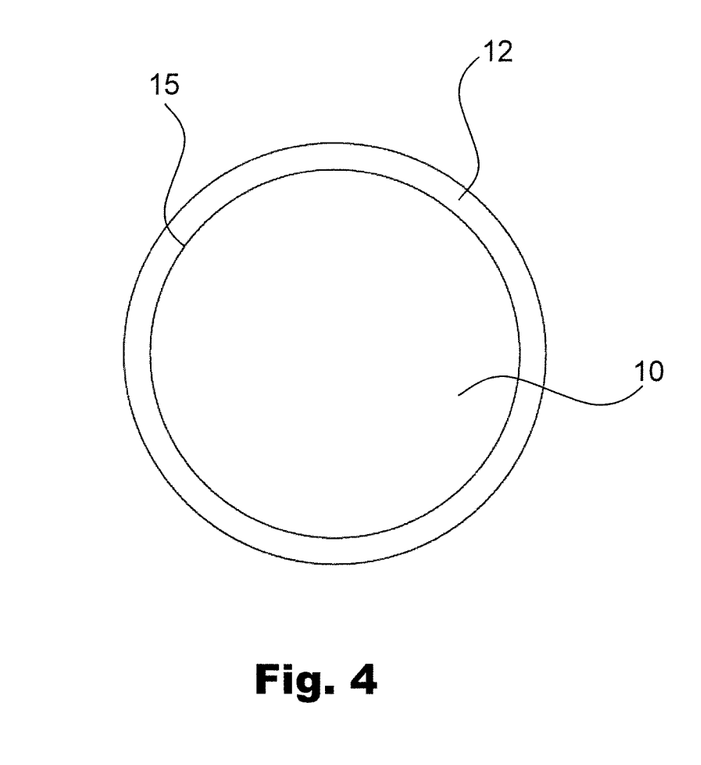
FIG. 4 shows a view from above on the foil of FIG. 3.

FIG. 1 shows a side view of a foil 10 at the beginning of a method according to an embodiment of the invention. FIG. 2 shows a view from above on the foil 10 of FIG. 1. FIG. 3 shows a side view of the foil 10 of FIG. 1 after undergoing a shape forming step; wherein FIG. 4 shows a view from above on the foil of FIG. 3. The foil 10 comprises a flat ring portion 12 wherein the inner portion is curved according to the needs of the lens to be produced. Reference numeral 11 is related to the outer circular edge of foil 10. The foil 10 comprises then a convex surface 14 and a concave surface 13. Different foil shape forming steps known in the prior art can be used.

Figure 13:
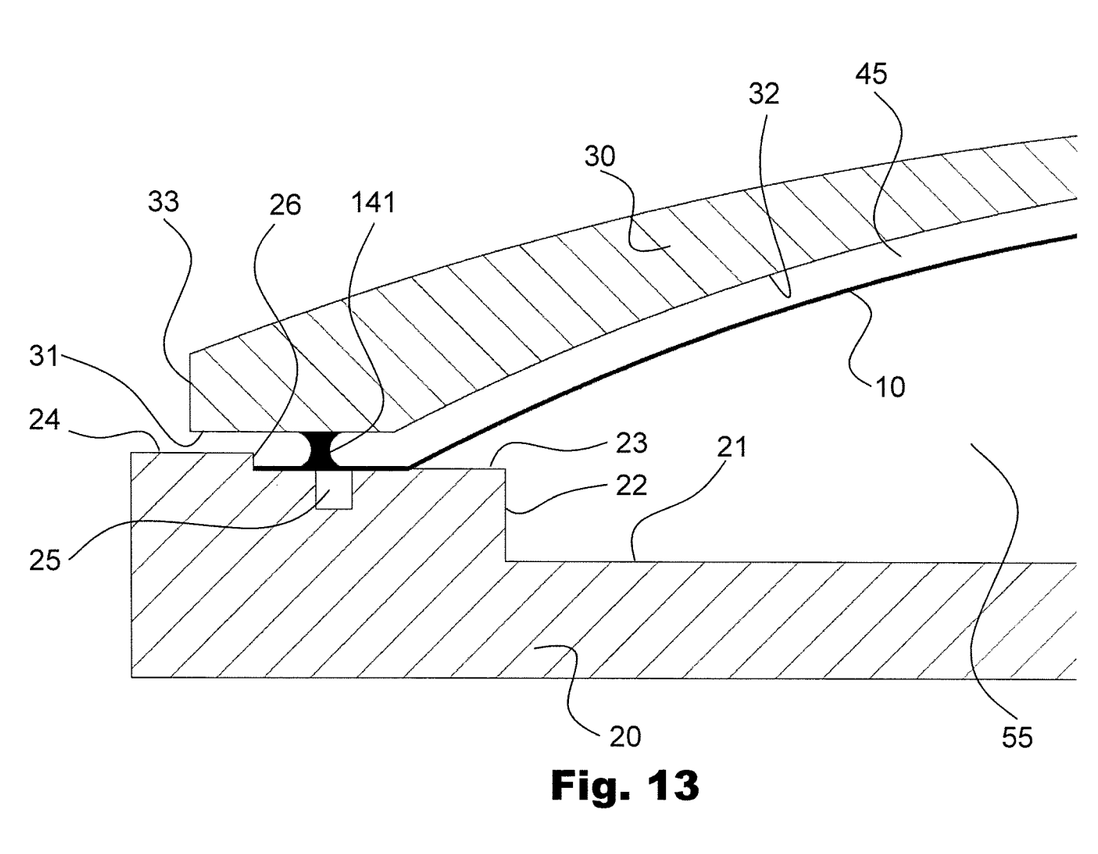
FIG. 13 shows a detail cross-section view of FIG. 9.

The outer curvature of the surface 14 is usually predetermined to be concentric to the inner surface and concave underside 32 of the front mould 30 as e.g. shown in FIG. 13. It can also be provided to be concentric to the inner surface and convex surface 132 of the lower mould 120 as shown e.g. in FIG. 15. The foil 10 is to be enclosed completely in the lens to be produced.

Figure 5:
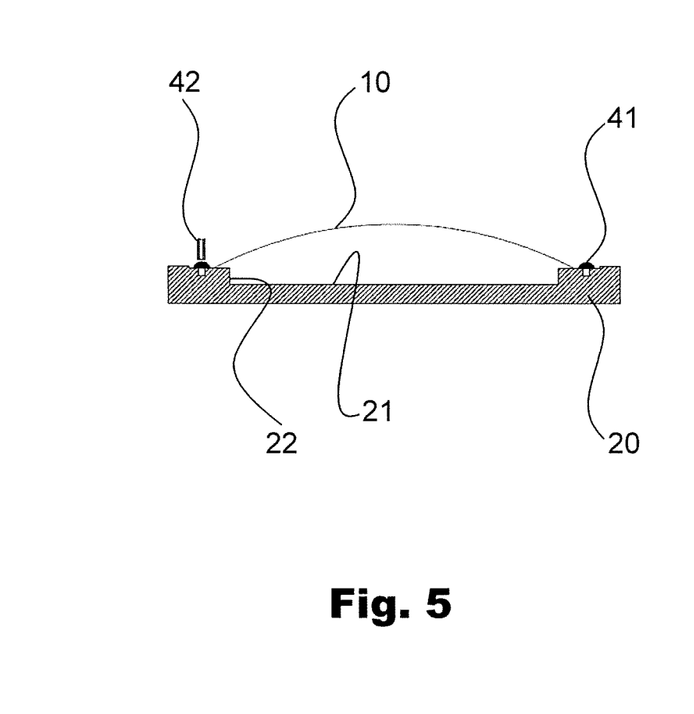
FIG. 5 shows a cross-section view on the foil fixation holder according to an embodiment of the invention with the foil of FIG. 3 and fixation dots.
Figure 6:
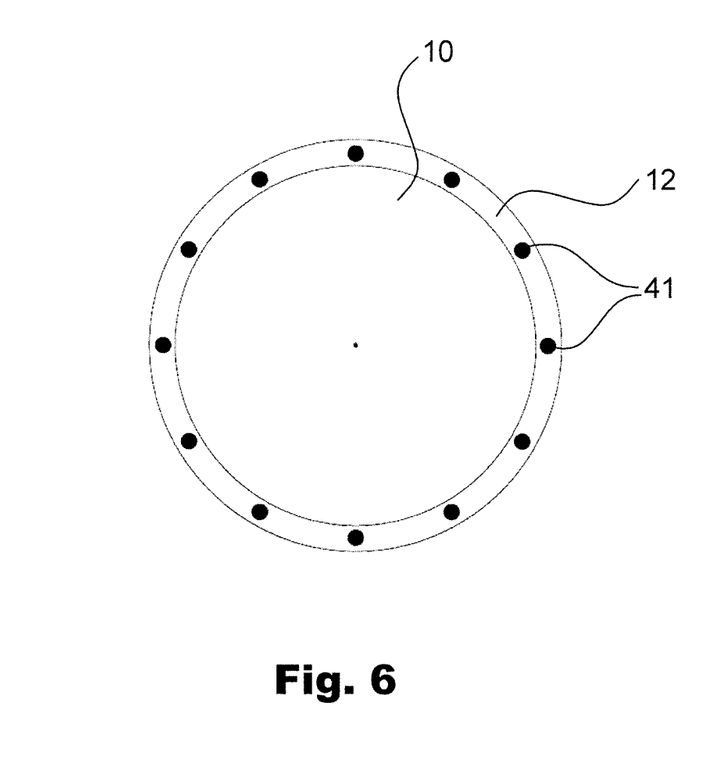
FIG. 6 shows a view from above on the foil as shown in FIG. 5 omitting the foil fixation holder.

FIG. 5 shows a cross-section view on the foil fixation holder 20 according to an embodiment of the invention with the foil 10 of FIG. 3 and fixation dots 41. FIG. 6 shows a view from above on the foil 10 as shown in FIG. 5 omitting the foil fixation holder 20.

Foil 10 is positioned on foil fixation holder 20 on inner top surface 23 which is better visible in FIG. 13. The foil fixation holder 20 comprises a base surface 21 surrounded by a circular side shoulder 22 followed by said inner top surface. FIG. 13 then shows the preferably provided circular abutment shoulder 26. The drawings show that the outer edge 11 of foil 10 abuts against shoulder 26. It is possible to provide a larger diameter foil fixation holder 20 so that edge 11 of foil 10 does not necessarily touch shoulder 26 anymore. In any case, the underside of the flat ring portion 12 is positioned on the inner top surface 23 and especially covers preferably the ring recess 25. It is possible that the recess 25 does not comprise the full ring but is only provided in several sections, e.g. in three sections separated by an angle of 120 degrees one from another. The recesses 25 are connected to a pump pumping fluid from the recesses creating a vacuum in the recesses 25 when the upper opening of the recesses is closed by the flat ring portion 12. It is also possible to provide a number of separate bores. Thus the foil 10 is maintained in its position on the foil fixation holder 20 and can be used in the next production step of a lens with an embedded foil 10.

In other embodiments there is no recess of the base surface 21 and inner top surface 23 and base surface 21 are at the same level. It is noted that the recess is to be provided with the shoulder 22 being under the flat ring portion 12, when the foil 10 is to be attached to the back mould 120 instead of the front mould 30. Then the convex part of foil 10 extends into said recess.

Twelve fixation dots 41 are provided in regular angular distance of 30 degrees one from another on the flat ring portion 12 of the foil 10. The fixation dots 41 are shown as circular drops. They can be applied with a fixation dot applicator 42 as shown in FIG. 5 comprising a dispensing valve and a needle. They can comprise or consist of an UV curing adhesive. The distance between each two of the different fixation dots 41 is preferably similar or equal. Of course, it is possible to use less fixation dots as e.g. eight or six, or more fixation dots 41 as twenty. However, it is important that a free angular space remains between the fixation dots 41. It is also possible in other embodiments to provide fixation areas on the flat ring portion 12, i.e. fill the complete annulus section between two of the fixation dots 41 of FIG. 5 on the flat ring portion 12. The fixation application process is executed while the foil 10 is maintained and sucked on inner top surface 23.

It is also possible to provide the fixation dots 41 on the ring-shaped underside 31 of the front mould 30. In such a case, FIGS. 5 and 6 would only comprise the positioning of the foil 10 but the application of the dots 41 would be performed on the front mould 30, which means that the dots 41 of FIG. 7 would be attached to the front mould 30 instead of being attached to the foil 10. In case of a further embodiment (not shown in the drawings) wherein the roles of the front mould 30 and the back mould 120 are inverted when used with the foil fixation holder 20, i.e. the foil fixation holder 20 is used in connection with the back mould 120 instead of the front mould 30, then the fixation dots 41 can be attached to the back mould 120 instead of being attached to the foil 10.

Figure 7:
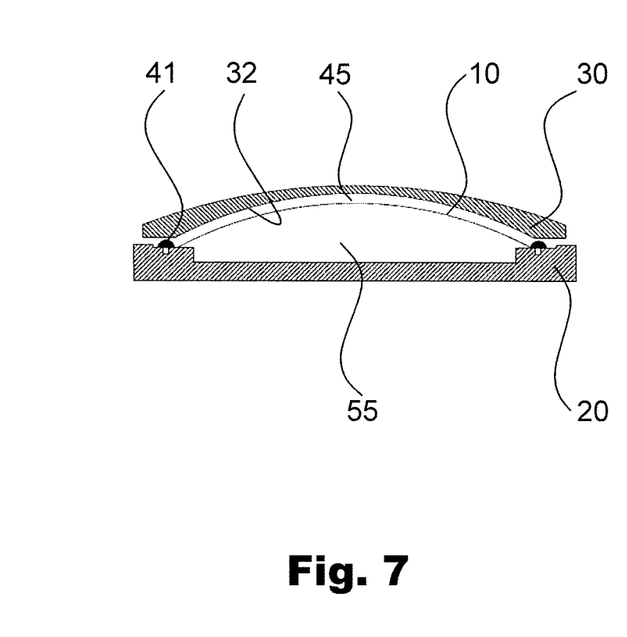
FIG. 7 shows a cross-section view on the foil fixation holder with the foil according to FIG. 5 after positioning a front mould above the fixation dots.
Figure 8:
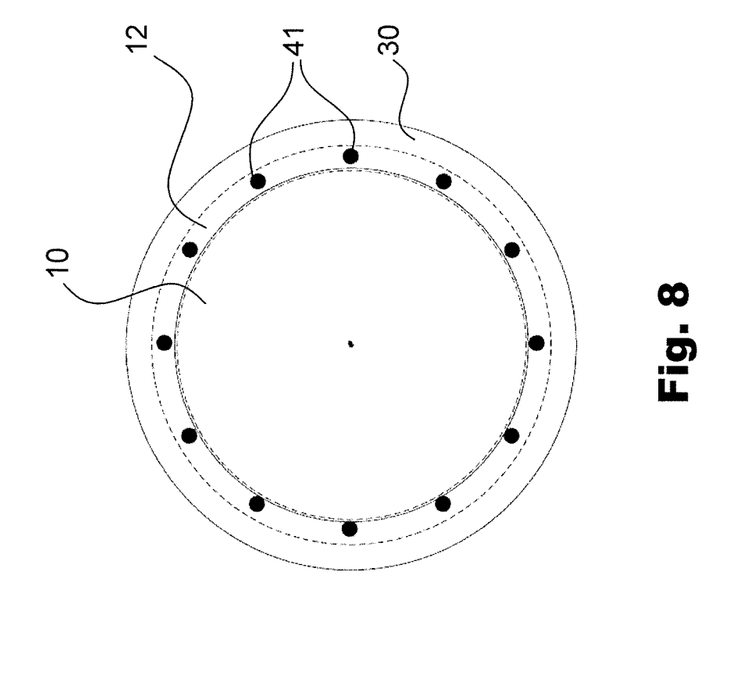
FIG. 8 shows a view from above on the foil as shown in FIG. 7 with a front mould shown in broken lines.

FIG. 7 shows a cross-section view on the foil fixation holder 20 with the foil 10 according to FIG. 5 after positioning a front mould 30 above the fixation dots 41; wherein the ring shaped underside 31 of mould 30 is still in a small distance from the fixation dot 41 surface. FIG. 8 shows a view from above on the foil 10 as shown in FIG. 7 with a front mould 30 shown in broken lines. The position of foil 10 between foil fixation holder 20 and front mould 30 create spaces, i.e. the front mould cavity 45 between the upper side 14 of the foil 10 and the concave underside 32 and a back mould cavity 55 between the underside 13 of the foil 10 and the base surface 21 of foil fixation holder 20.

Figure 9:
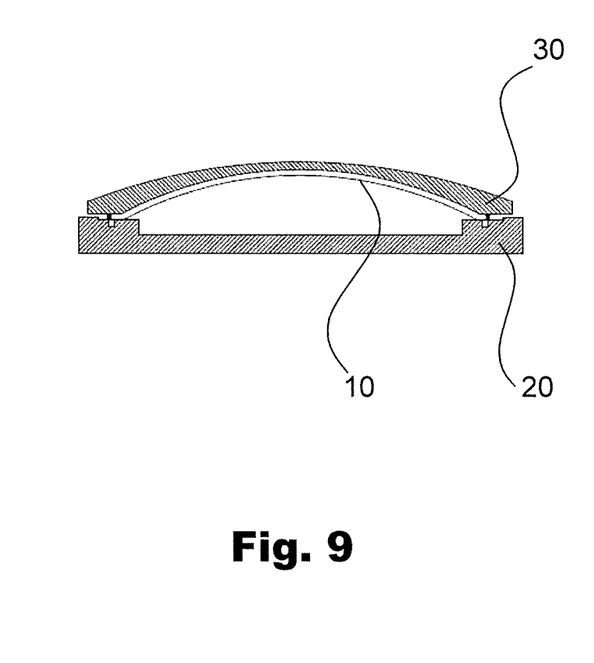
FIG. 9 shows a cross-section view on the assembly of FIG. 7 after making contact of the front mould with the fixation dots.
Figure 10:
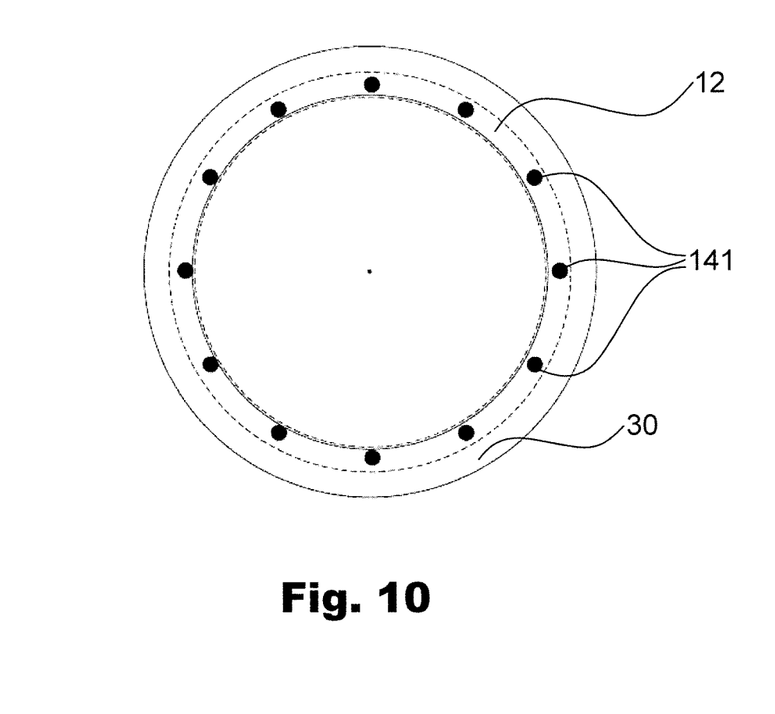
FIG. 10 shows a view from above on the foil as shown in FIG. 9 with a front mould shown in broken lines.

FIG. 9 shows a cross-section view on the assembly of FIG. 7 after making contact/wetting of the front mould 30 with the now attached fixation dots 141 and FIG. 10 shows a view from above on the foil 10 as shown in FIG. 9 with a front mould 30 shown in broken lines. In this step, the front mould 30 is displaced in a translatory movement relative to foil fixation holder 20 to ensure contact/wetting of the fixation dots 41 with the ring shaped underside surface 31 of the front mould 30 to become attached fixation dots 141, i.e. in contact with foil 10 and mould 30.

Before curing the attached fixation dots 141, the first mould or the fixation holder can be displaced further to adjust the desired distance between the first mould and the foil. Therefore, a distance adjusting spreader (not shown) can be provided to engage between the ring shaped underside 31 of the front mould 30 and the outer top surface of the foil fixation holder. Since the contact of the attached fixation dots 141 between front mould 30 and foil 10 is made, the distance adjusting spreader can either increase or decrease the distance between mould 30 and holder whereby the attached fixation dots 141 are stretched or compressed, wherein said distance between mould 30 and foil 10 on the holder (and angular relationship) is then finally fixable, when the adhesive is hardening or, preferably cured as explained below.

Figure 11:
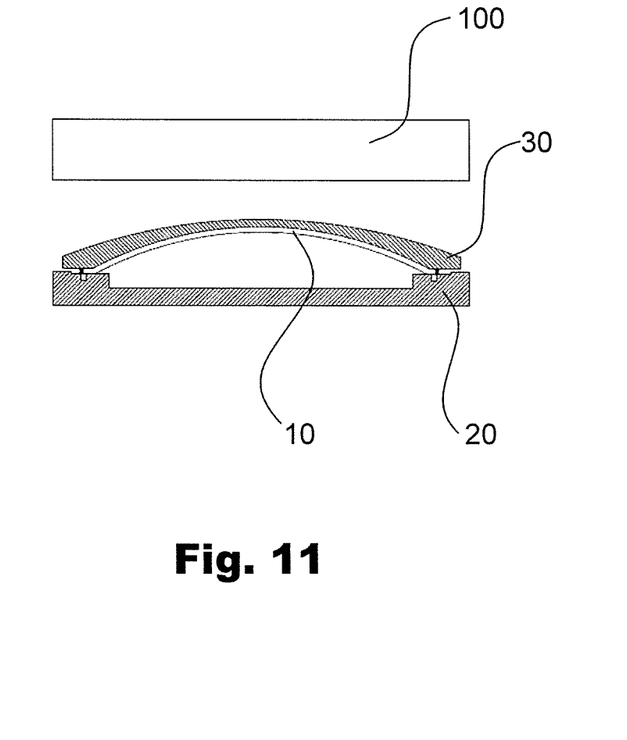
FIG. 11 shows a cross-section view on the assembly of FIG. 7 after making contact of the front mould with the fixation dots during a curing step of the adhesive dots.
Figure 12:
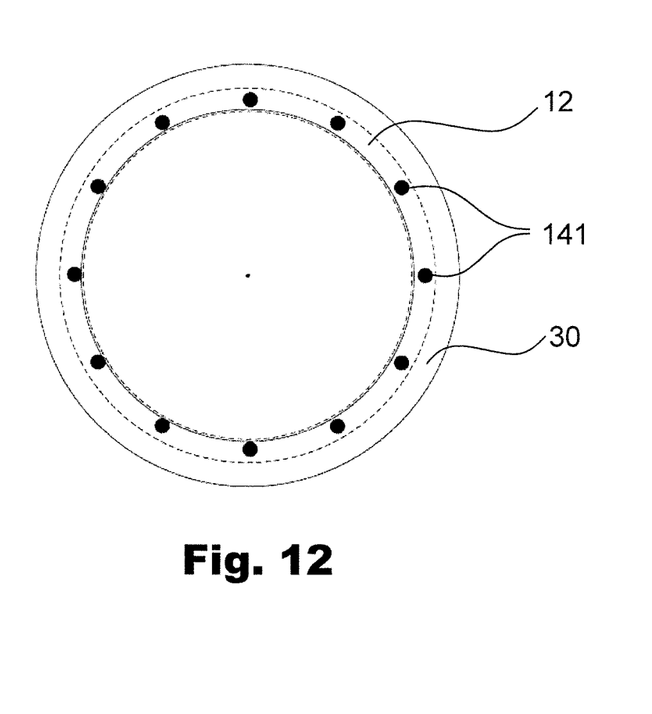
FIG. 12 shows a view from above on the foil as shown in FIG. 9 with a front mould shown in broken lines.

FIG. 11 shows a cross-section view on the assembly of FIG. 7 after making contact of the front mould 30 with the fixation dots 41 during the curing step of the attached adhesive fixation dots 41, i.e. it shows the same situation as FIG. 10, only later in time during/after curing. FIG. 12 shows a view from above on the foil 10 as shown in FIG. 11 with a front mould 30 shown in broken lines. A curing lamp 100 is positioned above the front mould 30 being essentially transparent for UV light. Then the attached fixation dots 141 are secured to the front mould 30, the pump creating the suction within recesses 25 can be stopped, the vacuum canceled and the foil fixation holder 20 can be taken away and replaced by a back mould 120 to produce the lens with the embedded foil as explained below.

FIG. 13 shows a detail cross-section view of FIG. 9 showing that foil fixation holder 20 has a base surface 21, a parallel inner top surface 23 and an outer top surface 24 with two connecting circular shoulders 22 and 26. Of course, if the foil 10 and the lens to be produced would not be circular but e.g. elliptical then the foil fixation holder 20 and mould 30 would have similar e.g. elliptical outer areas. It is important to note that the fixation of the dots 41 occur in an inner portion of underside 31 and that edge 11 of foil 10 ends underneath the underside 31 and is not extended until the outer edge surface 33 of the front mould 30. This is ensured inter alia by the abutment shoulder 26 of the foil fixation holder 20. The same features will apply, if the foil 10 is to be attached at the back mould 120 instead of being attached to the front mould 30.

The optical axis of the lens to be produced is perpendicular to the inner top surface 23 and parallel to the outer edge surface 33 of the front mould 30.

However, it is also possible that the entire foil 10 is curved and there is no flat ring section 12. Then the corresponding attachment surfaces 23 of the back mould 20 as well as the backside 31 of the front mould 30 are preferably curved in the same complementary manner. Then the fixation dots 41 and the applicator 42 are also inclined according to the curvature of the foil 10 edge section. The same applies, if the fixation dots 41 are to be applied onto ring-shaped underside 31 of the front mould 30, which is then curved in a complementary manner to the foil 10, whereas it is also possible that the attachment of the fixation dots 41 is made on the back mould 120, if it is intended to use the back mould 120 instead of the front mould 30 as basis for the method.

Figure 14:
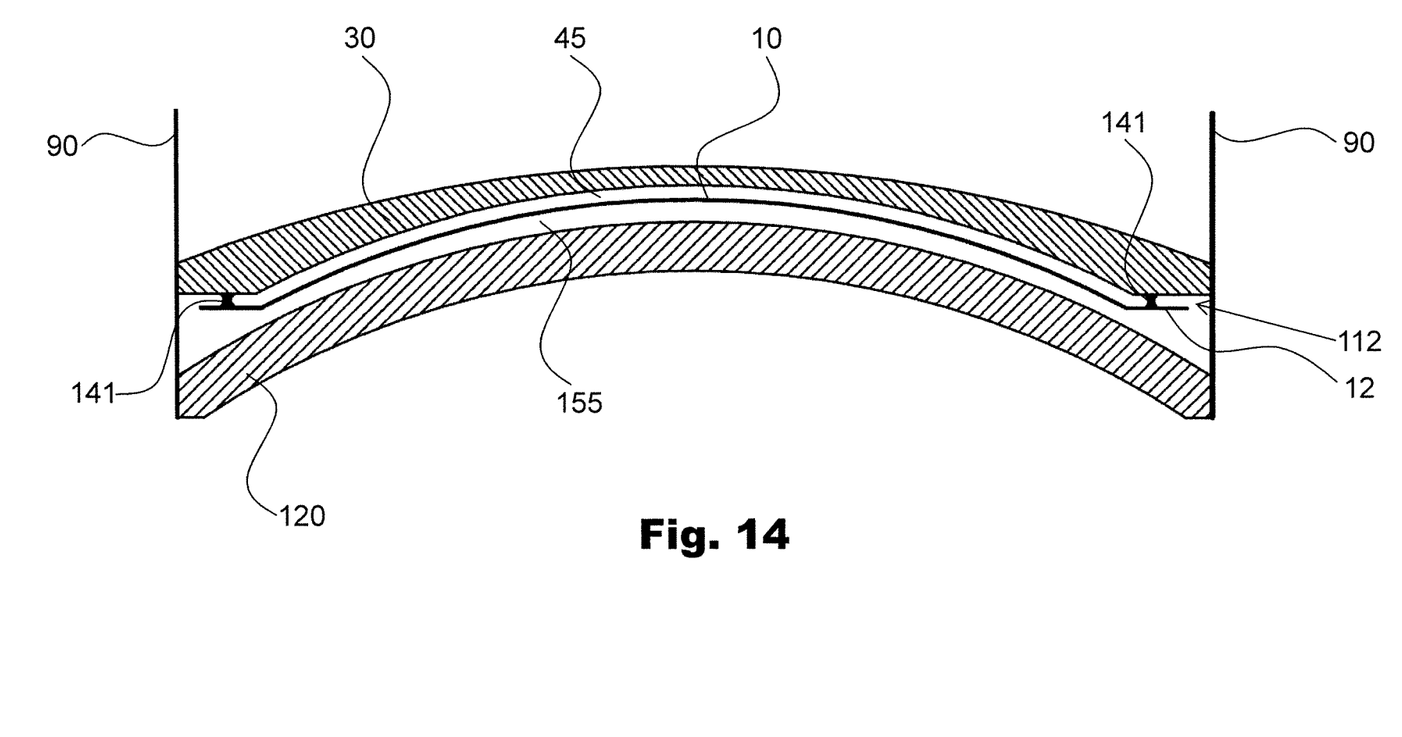
FIG. 14 shows a cross-section view on an assembly similar to FIG. 9 wherein the foil fixation holder had been replaced by a back mould to form a sealed mould cavity.
Figure 15:
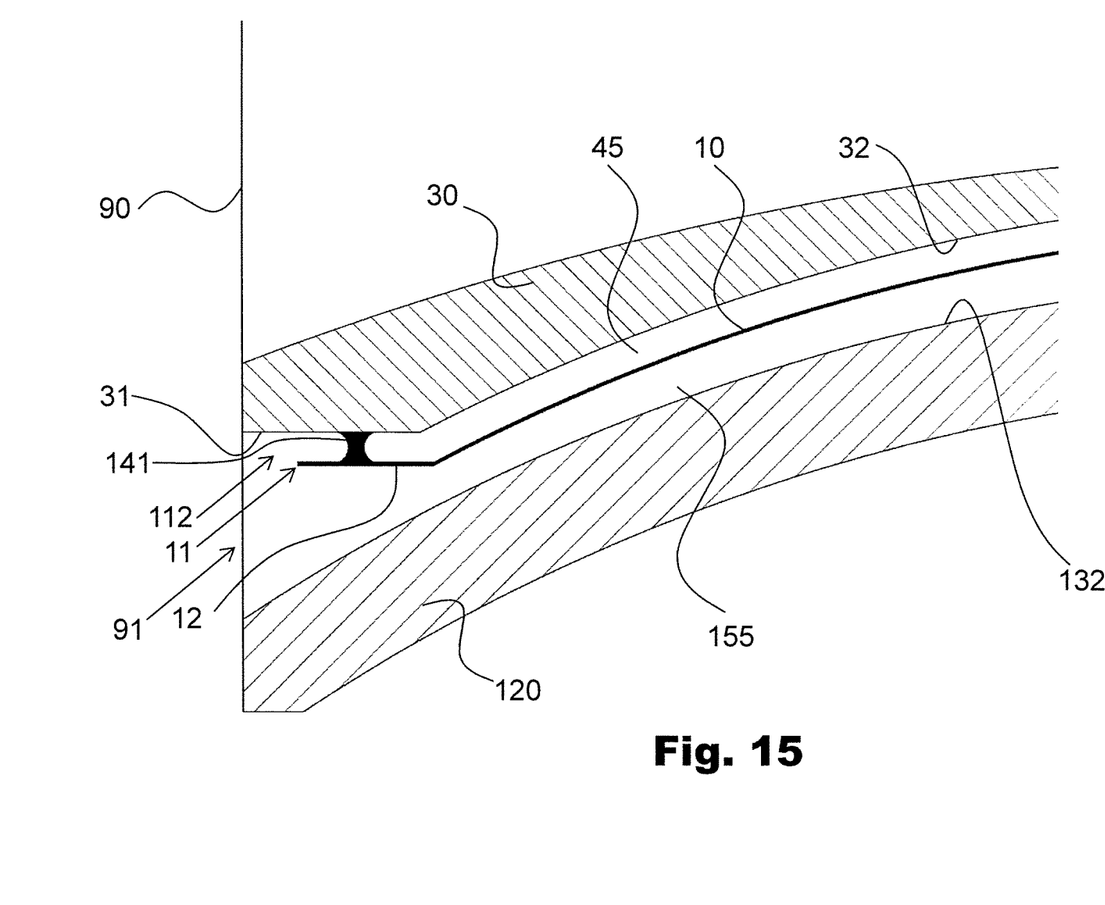
FIG. 15 shows a detail cross-section view of FIG. 14.

FIG. 14 shows a cross-section view on an assembly similar to FIG. 9 wherein the foil fixation holder 20 had been replaced by a back mould 120 for the production of a lens using a sealing element (tape or gasket) 90. FIG. 15 then shows a detail cross-section view of FIG. 14. In other words, after curing the fixation dots 141 the foil fixation holder 20 is displaced and moved away longitudinally parallel to the longitudinal axis of the lens to be produced and replaced by the back mould 120 as shown in FIG. 14. Then a tape 90 is wound around the moulds 30 and 120 creating a production assembly with a fixed position relationship between the two moulds 30 and 120 and thus of the inside positioned foil 10, affixed to the front mould 30 via the cured fixation dots 141. As can be seen in FIG. 15, this production assembly defines an inner front mould cavity 45 and an inner back mould cavity 155 defining the later lens volume. The outer edge 11 of the flat ring portion 12 does not touch the tape 90 at its circumference. There is instead a ring shaped passage 112 having a diameter which is at least partially in the range of the smallest distance between the foil 10 and the surrounding mould surfaces 32 and 132, and especially is not smaller than the smallest distance between the foil 10 and the surrounding mould surfaces 32 and 132.

The front mould 30 with the attached foil 10 via the cured fixation dots 141 is combined with a back mould 120 and sealed with a sealing element (tape or gasket) 90 to build a closed mould cavity. Building such a closed mould cavity is e.g. described in WO 2006/003099 A1.

Then, in the production process, an opening is created within tape 90 or the corresponding gasket in the area shown with reference numeral 91 between the moulds 120 and 30, preferably in the side regions of the back mould cavity 155. The assembly is preferably positioned with the later optical axis of the lens in a horizontal direction, so that the cavities 45 and 155 are mainly oriented vertically. Since the cavities 45 and 155 are interconnected, they form a single cavity. Then a liquid monomer is poured through the opening into the cavity. A second opening, a breather hole, is provided in the tape, preferably on the upper side of the assembly.

If the filling takes place from the upper side of the assembly, then the breather hole is provided near the first opening. If the filling takes place under pressure from the underside of the assembly, then the breather hole is provided opposite to the filler opening. This allows the monomer to either flow from the top to the bottom, filling the vertically oriented cavities 45 and 155 from above, or to push the monomer through the opening from below and supplant the remaining gas or air in the cavities 45 and 155.

In all cases the attached fixation dots 141 maintain the foil 10 in the predefined position while the monomer is flowing around it and it can enter in the cavity space 45 through the passage 112 between the edge 11 of the foil 10 and the tape 90 and then through the angular areas between the attached fixation dots 141.

When the filling process is finished and monomer is flowing out the breather hole, the assembly can be cured, which can be effected as UV curing under a curing illumination or as thermal curing, and the lens blank with its embedded foil is created.

Figure 16:
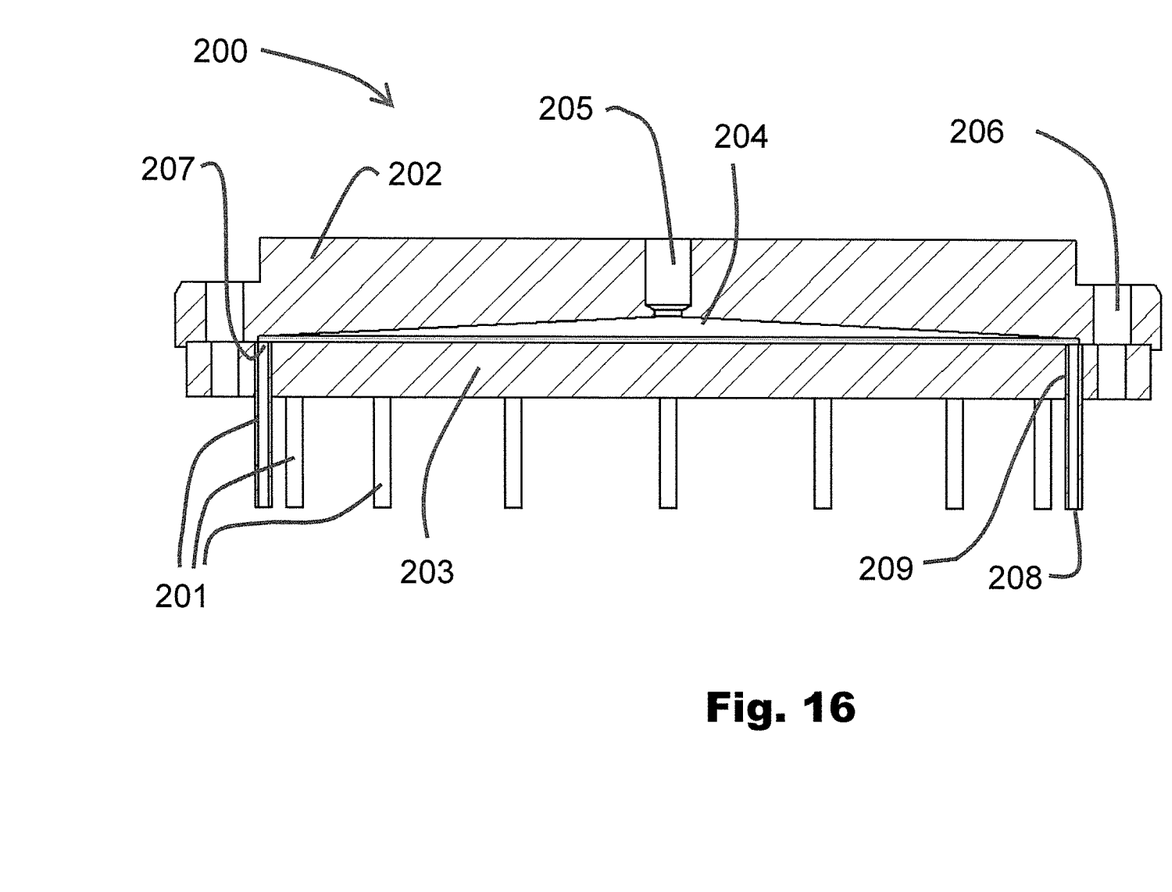
FIG. 16 shows a multiple dot dispensing tool to apply all attachment dots at once.

FIG. 16 shows a multiple dot dispensing tool to apply all attachment dots at once. The tool comprises an upper and a lower case body 202 and 203 of the dispensing head, which have at the circumference a number of concentric bores 206. Through these concentric bores 206 screws of bolts or further attachment means can be provided to clamp the two case body parts 202 and 203 together. The upper case 202 comprises a preferably central reservoir connection 205 to be connected with an outside reservoir of adhesive which is then transferred through the connection 205 to an internal cavity 204 within the upper case body 202 for homogenous distribution of adhesive. In other words, adhesive fills the reservoir 204 through the central connection 205 and is distributed towards the circumference of the cavity 204 which becomes more and more shallow towards the edges allowing for a continuous and homogenous distribution towards the openings in the lower part 203 of the dispensing head 200.

The lower case body 203 has a flat upper surface with a number of circumferential bores 209, preferably in a regular angular distance. FIG. 16 shows an embodiment with sixteen such bores 209 and corresponding sixteen such nozzles 201 which are positioned inside the bores 209 wherein the opening 207 is preferably flush with the upper surface of the lower case body 203. This can be a glued, fused or bonded connection. The nozzles 201 are hollow tubes of equal length. The length of all nozzles 201 is identical so that the mouth 208 of each nozzle 201 is in the same plane perpendicular to the longitudinal direction of the nozzles 201, i.e. all mouths 208 of all nozzles 201 will be all positioned at the same distance to a foil to be contacted by the adhesive as attachment dots 41 which will be homogenously be distributed in view of the symmetrical disposition of the connection 205, cavity 204 and nozzles 201.

The method can be executed faster, when the step of providing attachment dots 41 comprises applying the adhesive forming said attachment dots 41 all at the same time.

Such an application of the dots at the same time is even more favorable, if the step of providing attachment dots 41 comprises two or more sub-steps of providing multiple attachment dots on top of each other in order. Then larger distances of foil 10 to front mould 30 can be realized, when intermittently a curing/hardening step is executed in between each layer of dots.

The apparatus executing the above mentioned method of concurrent creation of attachment dots can be used as a stand-alone device.

The invention claimed is:

1. A method of producing a lens with an embedded foil, the method comprising:
   providing a first mould having an underside;
   providing a foil fixation holder;
   providing a second mould;
   providing a foil having at least one region being a curved surface;
   positioning the foil on the foil fixation holder;
   providing attachment dots on the foil on surface portions opposite to the foil fixation holder through application of an adhesive forming said attachment dots;

positioning the first mould opposite to the foil fixation holder;

displacing the first mould towards the foil fixation holder to contact the attachment dots with a surface of the first mould;

after contacting the surface of the first mould with the attachment dots, adjusting a contact distance between the first mould and the foil by increasing a displacement between the first mould and the foil fixation holder while maintaining contact of the attachment dots to both the surface of the first mould and the foil to ensure a desired contact distance between the surface of the first mould and the foil;

retracting the foil fixation holder;

positioning the second mould opposite to the first mould, wherein the foil is spaced from the second mould;

connecting the first mould and the second mould at their circumferences with a sealing bridging element to build an assembly in order to form a mould cavity with a pouring opening, wherein an edge of the foil is spaced apart from the sealing bridging element and the assembly comprises passages between the attachment dots and the foil and the underside of the first mould;

pouring a monomer into the mould cavity;

curing the monomer into a polymer block or a finished lens; and decomposing the assembly, thereby detaching the first mould and the second mould from the polymer block or the finished lens, respectively.

2. The method according to claim 1, wherein the first mould is a front mould and the second mould is a back mould or vice versa.

3. The method according to claim 1, wherein positioning the foil on the foil fixation holder comprises positioning flat surface portions of the foil on a flat surface of the foil fixation holder comprising one or more recesses connected to a vacuum pump to ensure the suctioning of the flat surface portions of the foil against said flat surface of the foil fixation holder.

4. The method according to claim 1, wherein positioning the foil on the foil fixation holder comprises positioning flat surface portions of the foil on a flat surface of the foil fixation holder, wherein the edge of the foil abuts against a shoulder of the foil fixation holder.

5. The method according to claim 1, wherein the attachment dots are provided along a circumference of the foil in regular angular distances one from another.

6. The method according to claim 5, wherein the attachment dots are fixation areas on a flat ring portion of the foil.

7. The method according to claim 5, wherein the attachment dots are circular drops.

8. The method according to claim 7, wherein between four and twenty attachment dots are provided.

9. The method according to claim 1, further comprising, after positioning of the first mould:
aligning the first mould relative to the foil on the foil fixation holder in angular and lateral direction.

10. The method according to claim 1, further comprising, after decomposing the assembly, if a product is the polymer block:
grinding and polishing at least one of a back and a front surface according to a desired prescription; and
cutting a lens with the embedded foil from the polymer block to fit in a frame.

11. The method according to claim 1, wherein the adhesive is a curable adhesive, and wherein, after having made contact of the attachment dots with a surface of the first mould and after adjusting the contact distance to the desired contact distance of the foil to the first mould, but before removing the foil fixation holder, the curable adhesive is cured.

12. The method according to claim 1, wherein providing the attachment dots comprises simultaneously applying the adhesive forming said attachment dots.

13. The method according to claim 1, wherein providing the attachment dots comprises two or more sub-steps of providing multiple attachment dots on top of each other in order to realize a larger distance of foil to first mould and intermittent curing/hardening steps in between each layer of attachment dots.

14. A method of producing a lens with an embedded foil, the method comprising:
providing a first mould having an underside;
providing a foil fixation holder;
providing a second mould;
providing a foil having at least one region being a curved surface;
positioning the foil on the foil fixation holder;
providing attachment dots on the first mould on the underside through application of an adhesive forming said attachment dots;
positioning the first mould opposite to the foil fixation holder;
displacing the first mould towards the foil fixation holder to ensure the contact of the attachment dots with a surface of the foil;
after contacting the surface of the foil with the attachment dots, adjusting a contact distance between the first mould and the foil by increasing a displacement between the first mould and the foil fixation holder while maintaining contact of the attachment dots to both the surface of the first mould and the foil to ensure a desired contact distance between the surface of the first mould and the foil;
retracting the foil fixation holder;
positioning the second mould opposite to the first mould, wherein the foil is spaced from the second mould;
connecting the first mould and the second mould at their circumferences with a sealing bridging element to build an assembly in order to form a mould cavity with a pouring opening, wherein an edge of the foil is spaced apart from the sealing bridging element and the assembly comprises passages between the attachment dots and the foil and the underside of the first mould;
pouring a monomer into the mould cavity;
curing the monomer into a polymer block or a finished lens; and
decomposing the assembly, and thereby detaching the first mould and the second mould from the polymer block or the finished lens, respectively.

15. The method according to claim 14, wherein positioning the foil on the foil fixation holder comprises positioning flat surface portions of the foil on a flat surface of the foil fixation holder comprising one or more recesses connected to a vacuum pump to ensure the suctioning of the flat surface portions of the foil against said flat surface of the foil fixation holder.

16. The method according to claim 14, wherein positioning the foil on the foil fixation holder comprises positioning flat surface portions of the foil on a flat surface of the foil fixation holder, wherein the edge of the foil abuts against a shoulder of the foil fixation holder.

17. The method according to claim 14, wherein the attachment dots are in fixation areas provided on the first mould on the underside of it through application of an adhesive forming said attachment dots opposite to a flat ring portion of the foil.

18. The method according to claim 14, further comprising, after positioning of the first mould, aligning the first mould relative to the foil on the foil fixation holder in angular and lateral direction.

19. The method according to claim 14, wherein the adhesive is a curable adhesive, and wherein, after having made contact of the attachment dots with a surface of the foil and after adjusting the contact distance to the desired contact distance of the foil to the first mould, but before removing the foil fixation holder, the curable adhesive is cured.

20. The method according to claim 14, wherein providing the attachment dots comprises simultaneously applying the adhesive forming said attachment dots.

21. The method according to claim 14, wherein providing the attachment dots comprises two or more sub-steps of providing multiple attachment dots on top of each other in order to realize a larger distance of foil to first mould and intermittent curing/hardening steps in between each layer of attachment dots.

22. A method of producing a lens with an embedded foil, the method comprising:

providing a plurality of attachment dots on a surface of a foil, each attachment dot comprising adhesive;

displacing a first mould towards the foil to contact the attachment dots with a surface of the first mould;

after contacting the surface of the first mould with the attachment dots, adjusting a contact distance between the first mould and the foil by increasing a displacement between the first mould and the foil, the increasing causing stretching of the contacted attachment dots while maintaining contact of the attachment dots to both the surface of the first mould and the foil to ensure a desired contact distance between the surface of the first mould and the foil;

positioning a second mould opposite to the first mould, wherein the foil is spaced from the second mould;

forming a mould cavity between the first mould and the second mould, the foil being located within the mould cavity;

dispensing a polymerizable material into the mould cavity;

curing the polymerizable material in the mould cavity into a polymer block or a finished lens; and detaching the polymer block or the finished lens from the mould cavity.

\* \* \* \* \*